United States Patent [19]
Jeong

[11] Patent Number: 5,428,395
[45] Date of Patent: Jun. 27, 1995

[54] ENCODING AND DECODING METHOD AND APPARATUS THEREOF USING A VARIABLE PICTURE PARTITIONING TECHNIQUE

[75] Inventor: Jechang Jeong, Seoul, Rep. of Korea

[73] Assignee: Samsung Electronics Co., Ltd., Kyungki-do, Rep. of Korea

[21] Appl. No.: 78,134

[22] Filed: Jun. 18, 1993

[30] Foreign Application Priority Data

Jun. 18, 1992 [KR] Rep. of Korea .................... 92-10617

[51] Int. Cl.⁶ .............................................. H04N 7/36
[52] U.S. Cl. .................................. 348/412; 348/420
[58] Field of Search ............... 348/420, 701, 497, 608, 348/403, 404, 405, 406, 407, 408, 410, 411, 412; H04N 7/137

[56] References Cited

U.S. PATENT DOCUMENTS 5,107,348 4/1992 Citta et al. .......................... 348/407

Primary Examiner—Tommy P. Chin
Assistant Examiner—A. Au
Attorney, Agent, or Firm—Sughrue, Mion, Zinn, Macpeak & Seas

[57] ABSTRACT

An encoding and decoding system in which video data is partitioned into blocks, each of which has a predetermined dimension, and the partitioned block is encoded and decoded. To suppress blocking artifacts which occur at the boundary portions of the blocks, the positions of the partitioned blocks are slightly altered for every frame and then encoded. Then the encoded video data is variably partitioned and decoded in a similar manner to the encoding procedure. To variably partition a picture, the encoding and decoding systems include an address generator for variably partitioning the blocks in a horizontal direction of the picture, another address generator for variably partitioning the blocks in a vertical direction of the picture, and a sync generator for synchronizing the partitioning of every frame of video data in the encoding and decoding procedures, respectively.

20 Claims, 3 Drawing Sheets

ENCODING AND DECODING METHOD AND APPARATUS THEREOF USING A VARIABLE PICTURE PARTITIONING TECHNIQUE

BACKGROUND OF THE INVENTION

The present invention relates to a system for encoding and decoding digital video data, and more particularly to an encoding and decoding system which adopts a variable picture partitioning technique in order to suppress blocking artifacts which are one of the phenomena degrading the quality of reproduced pictures, and which are generated by partitioning a picture into a plurality of blocks and encoding the blocks. The present disclosure is based on the disclosure of Korean Patent Application No. 92-10617, filed Jun. 18, 1992.

Recently, a method for encoding a video and audio signal into a digital signal so as to be transmitted or stored in a storage unit, and decoding the encoded digital signal so as to be reproduced has been used in systems for transmitting and receiving video and audio signals. Various techniques are known, including conversion coding method, a differential pulse code modulation method, (OPCM) a vector quantization method and a variable length coding method, etc., for encoding such a transmitted or stored signal. By removing redundancy data which is included in the transmitted or stored signal, these coding methods can be used for compressing the total amount of data.

To better explain the present invention, the above encoding and decoding procedures with respect to the video signal will be described below. Generally, to encode the video signal, each picture is partitioned into blocks, each of which has a predetermined dimension, and a predetermined transformation is performed with respect to the respective block data or error data between predetermined blocks, so that video data is converted into a transformation coefficient of frequency domain. Such data transform methods include discrete cosine transform (DCT), Walsh-Hadamard transform (WHT), discrete Fourier transform (DFT) and discrete sine transform (DST), etc. The transmission data is compressed by changing transformation coefficients, converted by one of the above transformation methods, into representative values, each of which has a certain level, and encoding the representative values based on their statistical characteristics.

FIG. 1 represents a schematic block diagram of a conventional encoding apparatus of a video signal. The encoding apparatus of FIG. 1 comprises means for partitioning video data into blocks, each of which has a predetermined dimension, means for DCT-transforming each block of data and then quantizing the transformed coefficients, means for variable-length encoding the quantized data to compress the variable-length encoded data. The apparatus also comprises means for inverse-quantizing and inverse-transforming the quantized data into restored data which is close to the original blocks of data, means for reconstructing a frame from the restored data, and means for performing motion detection and motion compensation from the reconstructed frame and the current block to be encoded. In FIG. 1, block partitioner 10 partitions the input data into blocks of $N \times N$ (which is generally represented as $N_1 \times N_2$, and which, for the convenience of explanation, is assumed as here to be $N_1 = N_2 = N$, where "N" represents a pixel unit) magnitude. Then, the block of data output from block partitioner 10 is added to predetermined feedback data in a first adder A1, thereby calculating error data between the two data blocks. The error data is DCT-transformed into transformation coefficients of a frequency domain in orthogonal transformer 11. Here, the energy of the transformation coefficients is chiefly collected toward the low frequency domain. Then, quantizer 12 changes the conversion coefficients into representative values each of which has a predetermined level, taking the energy distribution of the conversion coefficients into consideration. Then, variable-length encoder 13 further compresses transmission data $V_{CD}$ by variable-length-encoding the representative values based on the statistical characteristics of the representative values.

Also, there is, in general, much similarity between adjacent pictures. Accordingly, in case of slightly moving pictures, the motion of the pictures is detected to calculate a motion vector MV. If the block data is compensated using the motion vector, a difference signal between the adjacent pictures becomes very small. Accordingly, the transmission data can be further compressed. To perform such motion compensation, inverse-quantizer 14 and inverse orthogonal-transformer 15 inversely quantize the quantization coefficients output from quantizer 12, and then inversely convert the inverse-quantized coeffcients into video data of spatial domain. The inverse-transformed video data is reproduction error data corresponding to error data output from first adder A1. The error data output from inverse orthogonal-transformer 15 is added to predetermined feedback data in a second adder A2 so as to be stored in a frame memory 16, thereby reconstructing a picture. Then, a motion detector 17 detects the block of data which is closest to the $N \times N$ block of data output from block partitioner 10 among the frame data stored in frame memory 16, and then calculates a motion vector MV which represents movements between two blocks. The motion vector MV is transmitted to a receiver for use in a decoding system shown in FIG. 2. Also, motion vector MV is transmitted to motion compensator 18 which is connected to frame memory 16 and motion detector 17. According to the motion vector supplied from motion detector 17, motion compensator 18 reads out an $N \times N$ block corresponding to the motion vector from the frame data stored in frame memory 16 and supplies the read $N \times N$ block to first adder A1. Then, as described above, the first adder calculates the error data between the $N \times N$ block of data supplied from block of partitioner 10 and the $N \times N$ block of data having the similar pattern supplied from motion compensator 18. The error data is encoded again as described above so as to be supplied to the receiver. In FIG. 1, switches RSW1 and RSW2 are refresh switches for refreshing the data in units of a frame or block, to prevent accumulation of the error data. That is, in the FIG. 1 apparatus, when two refresh switches RSW1 and RSW2 are turned on, the DPCM process is performed, while, when they are turned off, the PCM data is generated in adders A1 and A2.

Such encoded video data $V_{CD}$ is supplied to the receiver, and is input to the decoding apparatus shown in FIG. 2. Then, the encoded video data $V_{CD}$ is decoded in variable-length decoder 21 through inverse steps of the variable-length encoding processes. The data output from variable-length decoder 21 is inverse-quantized into transformation coefficients of a frequency domain in inverse-quantizer 22. An inverse orthogonal-transformer 23 converts the transformation coefficients of the frequency domain supplied from inverse-quantizer 22 into video data of a spatial domain. Here, the inverse-transformed video data is reproduction error data corresponding to the error data calculated in first adder A1 of the encoding apparatus. Also, the motion vector MV, which is calculated in motion detector 17 for transmission, is supplied to motion compensator 24 of the decoding apparatus. Motion compensator 24 reads out on N×N block of data corresponding to motion vector MV from the frame data stored in frame memory 25, and supplies the read N×N block of data to adder A. Then, adder A adds the inverse-converted error data to the N×N block data supplied from motion compensator 24, and supplies the added data to a display unit.

Generally, the encoding and decoding apparatus partitions the picture data into blocks, each of which has a predetermined dimension, to compress the transmitted video data, and encodes and decodes the partitioned blocks.

However, in such a conventional encoding and decoding system, since video data forming a picture is processed in block units having a predetermined dimension, the boundaries between mutual blocks are easily conspicuous, and a phenomenon takes place in which a certain portion of the picture appears to be a lattice. This phenomenon is called "blocking artifact." There have been recently proposed several methods of reducing such blocking artifacts. For example, a first method requires that the partitioned blocks in the picture are overlapped with each other, a second method utilizes a lapped orthogonal transform, and yet another method utilizes a low-pass filter with respect to the boundaries of the blocks in the decoding system. However, since the first and second methods change the general structural constitution of the encoding and decoding system as shown in FIGS. 1 and 2, they have problems in that complexity of the hardware increases. The third method has a problem in that it lowers resolution of the boundary portion of the block.

SUMMARY OF THE INVENTION

Therefore, to solve the above problems, it is an object of the present invention to provide an encoding system which adopts a variable picture partitioning technique for preventing blocking artifacts from occurring during reproduction, specifically when a picture is partitioned into blocks each of which has a predetermined dimension and the partitioned blocks are encoded, positions of the blocks into which the picture is partitioned are slightly varied for every frame to encode the blocks.

It is another object of the present invention to provide a decoding system which adopts a variable picture partitioning technique for decoding data which is encoded by an encoding system which adopts a variable picture partitioning technique in order to prevent blocking artifacts, when decoding picture data which is encoded after being partitioned into a plurality of blocks.

In an encoding system which partitions video data into blocks of a predetermined dimension, encodes the partitioned blocks, and performs a differential pulse code modulation (DPCM) in units of a block, considering correlation between a current frame and a preceding frame, the above first object of the present invention is accomplished by providing an encoding system which adopts a variable picture partitioning technique comprising:

means for generating a predetermined picture partitioning address for every frame so that a current frame is partitioned into blocks which have a predetermined displacement difference from blocks of a preceding frame;

means for generating a predetermined picture partitioning sync signal in order to match variable picture partitioning when encoding and decoding;

means for partitioning the input video data into a plurality of blocks according to the picture partitioning address; and means for storing block data restored for motion compensation according to the picture partitioning address to reconstruct a predetermined frame.

In a decoding system for decoding video data which is encoded after being partitioned into blocks each of which has a predetermined dimension, the above second object of the present invention is accomplished by providing a decoding system which adopts a variable picture partitioning technique comprising:

means for receiving data encoded by an encoding system which adopts a variable picture partitioning technique comprising means for generating a predetermined picture partitioning address for every frame so that a current frame is partitioned into blocks which have a predetermined displacement difference from blocks of a preceding frame, means for generating a predetermined picture partitioning sync signal in order to match variable picture partitioning when encoding and decoding, means for partitioning the input video data into a plurality of blocks according to the picture partitioning address, and means for storing block data restored for motion compensation according to the picture partitioning address to reconstruct a predetermined frame;

means for restoring the block data which has been variably partitioned and encoded;

means for generating a predetermined picture partitioning address each time the predetermined picture partitioning sync signal is supplied from the encoding system; and means for storing block data restored in a restorage means according to the picture partitioning address and reconstructing a predetermined frame.

DETAILED DESCRIPTION OF THE PREFERRED EMBODIMENTS

Preferred embodiments of the present invention will be described below in more detail with reference to the accompanying drawings.

Figure 1:
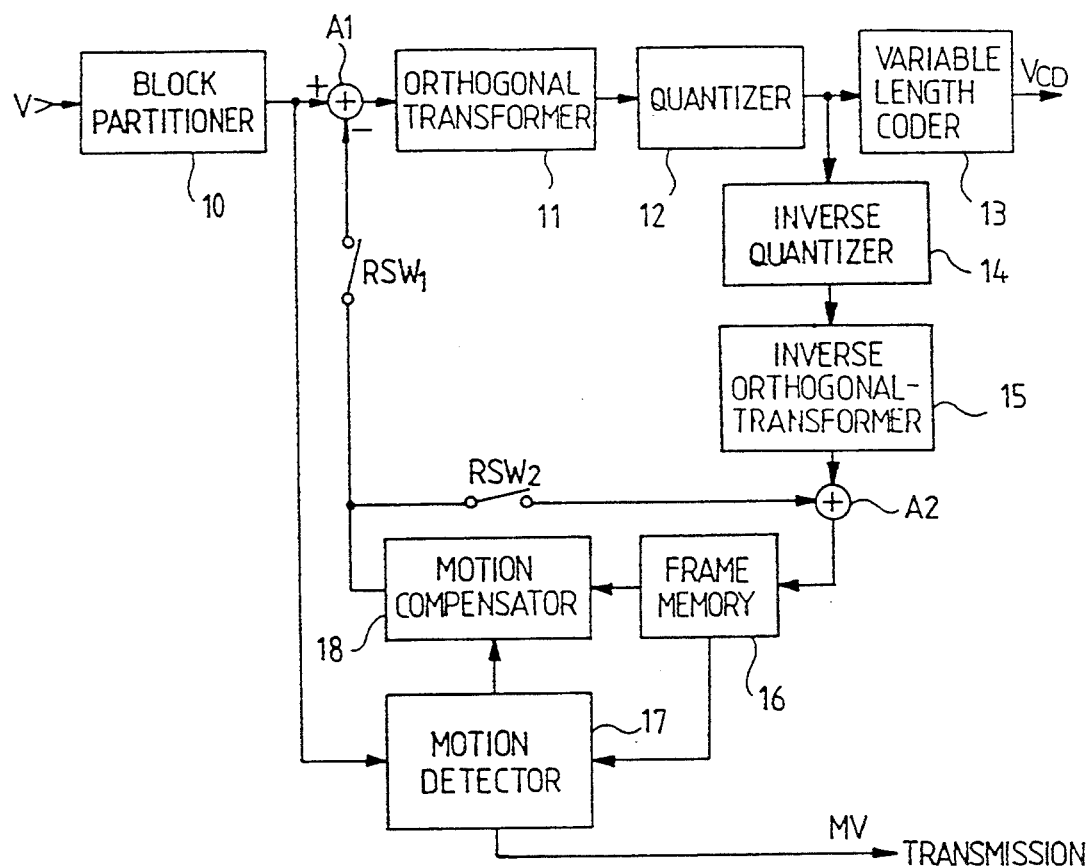
FIG. 1 is a block diagram of a conventional video data encoder.
Figure 3:
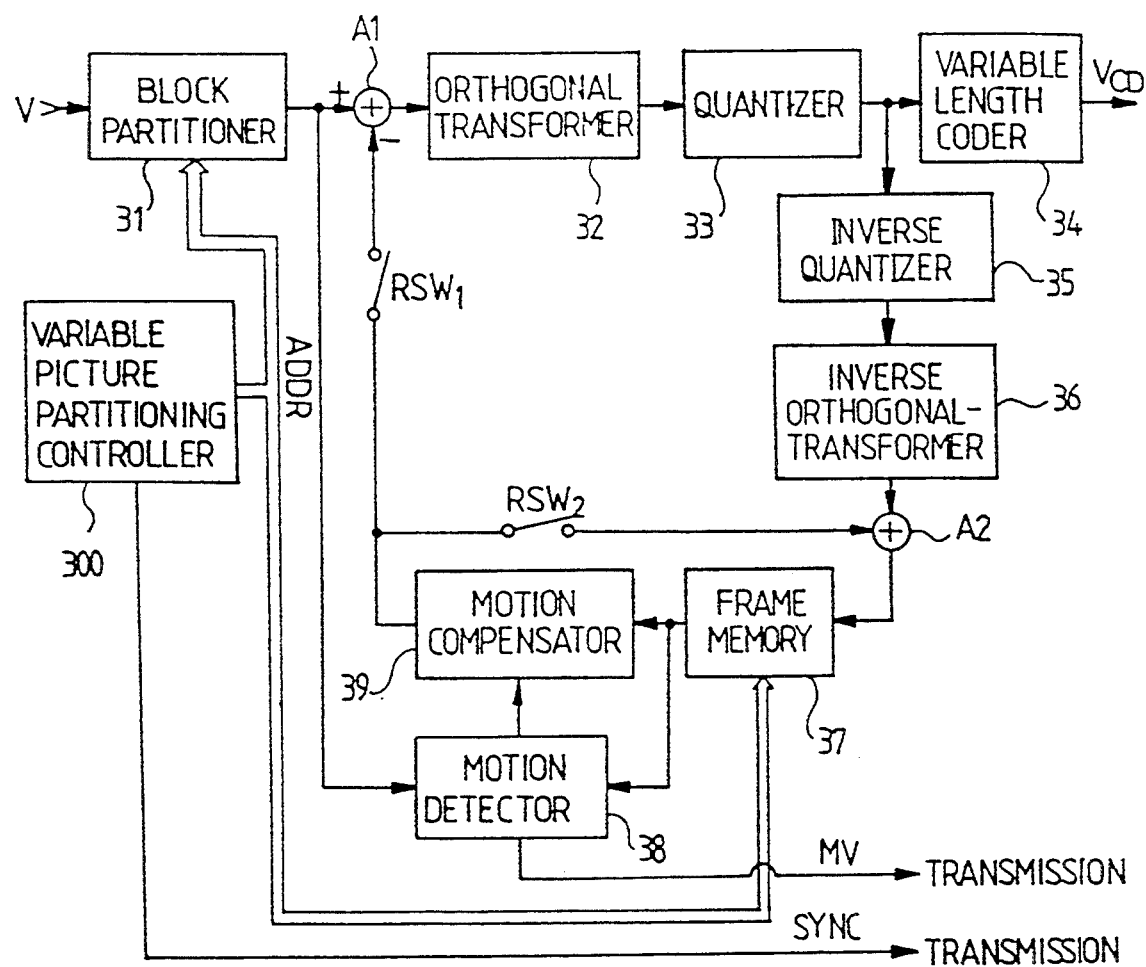
FIG. 3 is a block diagram of an encoding apparatus which adopts a variable picture partitioning technique according to an embodiment of the present invention.

The FIG. 3 apparatus comprises a variable picture partitioning controller 300 in addition to the elements shown in FIG. 1. Variable partitioning controller 300 is connected to a block partitioner 31 and a frame memory 37, respectively, to which a predetermined picture partitioning address ADDR is supplied. Also, variable picture partitioning controller 300 generates a predetermined picture partitioning sync signal SYNC for use in reproduction of data in a decoding procedure. Block partitioner 31 partitions a picture into blocks, each of which has a predetermined dimension, in which positions of the blocks vary by a predetermined displacement for every frame according to picture partitioning address ADDR supplied from variable picture partitioning controller 300. Also, address signal ADDR output from variable picture partitioning controller 300 is supplied to frame memory 37 so that the block data output from second adder A2 is stored in frame memory 37, thereby reconstructing the frame partitioned in block converter 31.

If every frame is encoded by the variable picture partitioning technique, the same picture partitioning having the same displacement should be performed for every frame in a decoding apparatus. Accordingly, variable picture partitioning controller 300 generates a predetermined picture partitioning sync signal SYNC in order to establish synchronization of the picture partitioning between the encoding and decoding procedures. Picture partitioning sync signal SYNC generated in a constant interval of time from variable picture partitioning controller 300 is supplied to a decoding apparatus. Another variable picture partitioning controller utilizes the received picture partitioning sync signal SYNC as a reference signal, to accordingly generate a predetermined picture-partitioning address.

Figure 4:
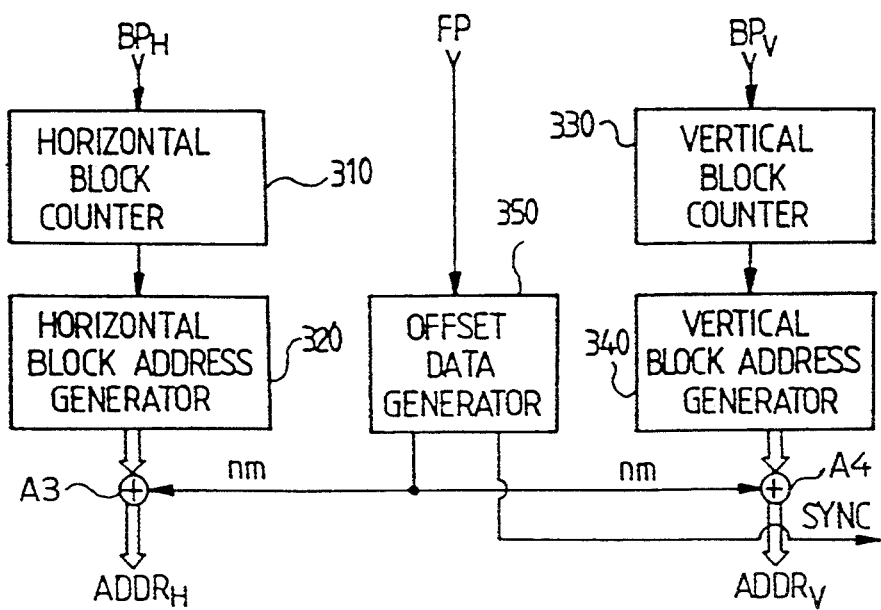
FIG. 4 is a detailed block diagram of the variable picture partitioning controller shown in FIG. 3.

FIG. 4 is a detailed block diagram of variable picture partitioning controller 300 shown in the FIG. 3 apparatus.

As shown in FIG. 4, variable picture partitioning controller 300 comprises a horizontal block counter 310 for receiving a horizontal block pulse $BP_H$ and counting the number of blocks in a horizontal direction, a horizontal block address generator 320 for generating a horizontal block address corresponding to a position of the block in the horizontal direction according to the counted value of horizontal block counter 310, a vertical block counter 330 for receiving a vertical block pulse $BP_V$ and counting the number of blocks in a vertical direction, a vertical block address generator 340 for generating a vertical block address corresponding to a position of the block in the vertical direction according to the counted value of vertical block counter 330, an offset data generator 350 for generating predetermined-dimensioned offset data nm each time a frame pulse FP is applied thereto, in which offset data generator 350 is reset when the offset value reaches a predetermined magnitude, and the picture partitioning sync signal SYNC is generated when reset, a first adder A3 for adding the horizontal block address data supplied from horizontal block address generator 320 to offset data nm supplied from offset data generator 350 to output a horizontal partitioning address $ADDR_H$, and a second adder A4 for adding the vertical block address data supplied from vertical block address generator 340 to offset data nm supplied from offset data generator 350 to output a horizontal partitioning address $ADDR_V$.

In FIG. 4, horizontal block counter 310 receives from an external source (not shown) horizontal block pulse $BP_H$ having a period of time which is coincident with an interval of each block in a horizontal direction, and counts the number of the input horizontal block pulse $BP_H$. The counted value of horizontal block counter 310 is supplied to horizontal block address generator 320. Horizontal block address generator 320 calculates and generates a horizontal block address corresponding to a position of each block in a horizontal direction from the frame to be partitioned into a plurality of blocks, using the counted value of horizontal block counter 310.

On the other hand, vertical block counter 330 receives a vertical block pulse $BP_V$ from the external source (not shown) having a period of time which matches an interval of each block in a vertical direction, so as to count the number of the input vertical block pulse $BP_V$. The counted value of vertical block counter 330 is supplied to a vertical block address generator 340. The vertical block address generator 340 calculates and generates a vertical block address corresponding to a position of each block in a vertical direction from the frame to be partitioned into a plurality of blocks, using the counted value of vertical block counter 330. To variably partition the frame for each frame, thus-obtained horizontal and vertical block addresses should be varied by a predetermined pixel for each frame.

An offset data generator 350 is provided as an element for varying the horizontal and vertical block address of each block for each frame. Offset generator 350 receives a frame pulse FP from the external source which is generated for each frame. Also, offset dam generator 350 generates offset data nm which increases by m pixels each time frame pulse FP is input therein. Here, when the number of pixels of the block is N×N, a value of m is chosen from among the values of 1 to N−1, whereby the value is generally taken as a very small one. When the value of m is 1, an effective and easily embodied method is provided. The maximum value of offset data run is smaller than N, and n is an integer coefficient for increasing the offset data by m for each frame. Thus, in this case, offset data generator 350 uses an up-counter having a modulo of N. Offset data nm output from offset data generator 350 is supplied to first adder A3 and second adder A4, respectively. Then, first adder A3 adds the horizontal block address output from horizontal block address generator 320 to the offset data nm, and outputs a horizontal partitioning address $ADDR_H$ which is altered by offset data nm in a horizontal direction. Also, second adder A4 adds the vertical block address output from vertical block address generator 340 to offset data nm, and outputs a vertical partitioning address $ADDR_V$ which is altered by offset data nm in a vertical direction. The above horizontal and vertical partitioning addresses $ADDR_H$ and $ADDR_V$ become a single picture partitioning address ADDR so as to be supplied to block partitioner 31 and frame memory 37, respectively. Then, block partitioner 31 performs block partitioning while the position of the block is varied by an offset of m for each frame in the horizontal and vertical directions according to picture partitioning address ADDR.

Figure 5A:
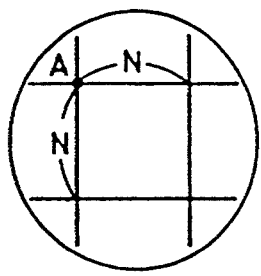
FIG. 5A–5C are schematic diagrams for explaining a variable picture partitioning process according to the present invention.
Figure 5B:
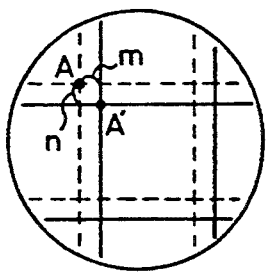
Figure 5C:
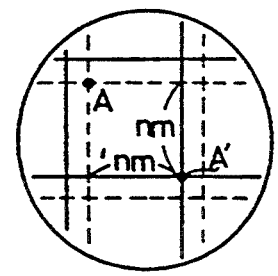

The above variable picture partitioning process is shown in FIGS. 5A to 5C. FIG. 5A shows a partitioning state before the picture partitioning is variably performed, that is, a state where offset data nm is not added to the horizontal and vertical block addresses. FIG. 5B shows a picture partitioned by a picture partitioning address ADDR in which a frame pulse FP is input to offset data generator 350, to accordingly generate offset data m, and the generated offset data m is added to the horizontal and vertical block addresses, thereby obtaining the picture partitioning address ADDR. As shown in FIG. 5B, current frame block A' is obtained by shifting the preceding frame block A by a value of m, to horizontal and vertical directions, respectively. Such a variable picture partitioning process repeated by a multiplicity of n is shown in FIG. 5C. That is, offset data generator 350 receives frame pulse FP n times, to accordingly generate offset data nm and add the generated offset data nm to the horizontal and vertical block addresses. Accordingly, as shown in FIG. 5C, current frame block A' is obtained by shifting initial frame block A by a value of nm, to horizontal and vertical directions, respectively. Offset data generator 350 is an up-counter having a modulo of N. Thus, when the offset data nm reaches a value of N, the up-counter starts again counting from a value of zero. Also, offset data generator 350 generates the picture partitioning sync signal SYNC each time frame pulse FP is input to thereby reset offset data nm. The picture partitioning sync signal SYNC is transmitted to a decoding portion, to accordingly synchronize the picture partitions of the encoding and decoding portions.

Figure 2:
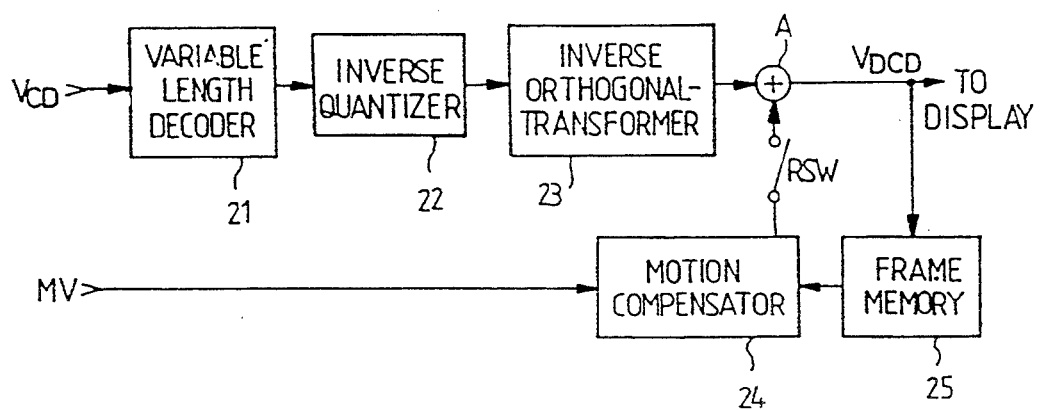
FIG. 2 is a block diagram of a conventional video data decoder.
Figure 6:
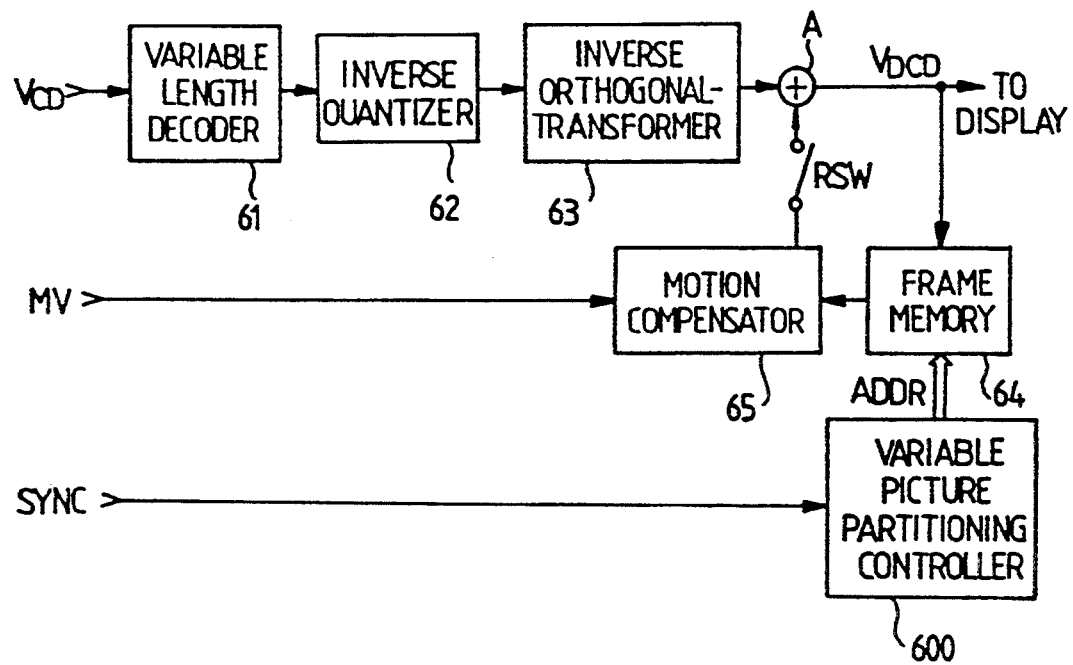
FIG. 6 is a block diagram of a decoding apparatus which adopts a variable picture partitioning technique according to another embodiment of the present invention.

FIG. 6 is a block diagram of a decoding apparatus which adopts variable a picture partitioning technique according to an embodiment of the present invention. The FIG. 6 apparatus comprises a variable picture partitioning controller 600 in addition to the elements of the FIG. 2 apparatus. Variable picture partitioning controller 600 receives a sync signal SYNC transmitted from the encoding portion and generates picture partitioning address signal ADDR for frame memory 64. Thus, the block data reproduced in the decoding portion is stored in frame memory 64 according to the variable picture partitioning technique. Variable picture partitioning controller 600 of the decoding apparatus has the same structural elements as variable picture partitioning controller 300 of the encoding apparatus shown in FIG. 4. However, offset data generator 350 in the variable picture partitioning controller 300 outputs sync signal SYNC, while the offset data generator in the variable picture partitioning controller 600 receives the sync signal. That is, offset data generator 350 of the encoding apparatus generates picture partitioning sync signal SYNC in predetermined intervals, while the offset data generator of the decoding apparatus receives the transmitted picture partitioning sync signal SYNC, to accordingly reset offset data nm to a value of zero. Then, in the same manner as that of the encoding apparatus, offset data nm is added to the horizontal and vertical addresses, respectively, to obtain horizontal partitioning address $ADDR_H$ and vertical partitioning address $ADDR_V$. The combined picture partitioning addresses ADDR are then supplied to frame memory 64. Then, the restored block data output from an adder A is stored in frame memory 64 according to picture partitioning addresses ADDR. Thus, the frame reproduced in the decoding apparatus is reconstructed so as to match the frame which has been variably partitioned in the encoding apparatus.

As described above, in partitioning a picture into a plurality of blocks and encoding and decoding the partitioned blocks, the encoding and decoding system which adopts the variable picture partitioning technique according to the present invention, performs the encoding and decoding while the positions of the blocks into which the picture is partitioned are minutely altered, thereby reducing the blocking artifacts which occur at the boundary portions of the blocks.

As described above, the present invention has been described through the particular embodiments. However, a variety of modifications and applications will be apparent to a person skilled in the art. The above descriptions will be included in the scope of the following claims.

What is claimed is:

1. In an encoding method, a variable picture partitioning method which maintains correlation between current frames and respective preceding frames of input video data, comprising the steps of:

generating a picture partitioning address for each said current frame, based on offset data which increases linearly and repetitively from frame to frame by a predetermined pixel dimension at a predetermined interval rate;

generating a picture partitioning sync signal indicative of said variable picture partitioning method; and partitioning each said current frame of the input video data into a plurality of blocks according to said picture partitioning address.

2. The variable picture partitioning method according to claim 1, wherein said picture partitioning address generating step comprises the steps of, for each said current frame:

generating a horizontal block address which designates a position of each block in a horizontal direction;

generating a vertical block address which designates a position of each block in a vertical direction;

generating said offset data;

adding said horizontal block address to said offset data; and adding said vertical block address to said offset data.

3. The variable picture partitioning method according to claim 1, wherein said offset data is reset upon increasing to a predetermined value and said picture partitioning sync signal is generated each time said offset data is reset.

4. The variable picture partitioning method according to claim 2, wherein said offset data is reset upon increasing to a predetermined value and said picture partitioning sync signal is generated each time said offset data is reset.

5. The variable picture partitioning method according to claim 2, wherein said horizontal block address generating step comprises the steps of:

receiving horizontal block pulses defining block partitions of each said current frame in a horizontal direction;

counting said horizontal block pulses and thereby producing a counted value; and generating said horizontal block address, which designates positions of said block partitions in the horizontal direction, for each said current frame, in accordance with said counted value.

6. The variable picture partitioning method according to claim 2, wherein said vertical block address generating step comprises the steps of:
receiving vertical block pulses defining block partitions of each said current frame in a vertical direction;
counting said vertical block pulses and thereby producing a counted value; and
generating said vertical block address, which designates positions of said block partitions in the vertical direction, for each said current frame, in accordance with said counted value.

7. The variable picture partitioning method according to claim 2, wherein
each said block has a first pixel dimension in the horizontal direction and has a second pixel dimension in the vertical direction; and
said predetermined pixel dimension is less than said first pixel dimension in the horizontal direction and is less than said second pixel dimension in the vertical direction.

8. In a decoding method, a variable picture partitioning method comprising the steps of:
receiving frames of video data as blocks of partitioned pixel data that has been partitioned, in an encoding method, in accordance with a variable picture partitioning technique comprising the steps of
(i) generating a picture partitioning address for each current frame of input video data, based on offset data which increases linearly and repetitively from frame to frame by a predetermined pixel dimension at a predetermined interval rate,
(ii) generating a picture partitioning sync signal indicative of said variable picture partitioning technique, and
(iii) partitioning each said current frame of the input video data into a plurality of blocks according to said picture partitioning address;
receiving said picture partitioning sync signal; and
in response to said picture partitioning sync signal, generating, for each said received frame of video data, a restored picture partitioning address, based on analogous offset data which also increases linearly and repetitively from frame to frame by said predetermined pixel dimension and at said predetermined interval rate.

9. The variable picture partitioning method according to claim 8, wherein said step of generating said restored picture partitioning address comprises the steps of, for each said received frame:
generating a restored horizontal block address which designates a position of each block in a horizontal direction;
generating a restored vertical block address which designates a position of each block in a vertical direction;
generating said analogous offset data;
adding said restored horizontal block address to said analogous offset data; and
adding said restored vertical block address to said analogous offset data.

10. The variable picture partitioning method according to claim 9, wherein said step of generating said restored horizontal block address comprises the steps of:
receiving horizontal block pulses indicative of the partitioning of said blocks of partitioned pixel data in a horizontal direction;
counting said horizontal block pulses and thereby producing a counted value; and
generating said restored horizontal block address in accordance with said counted value.

11. The variable picture partitioning method according to claim 9, wherein said step of generating said vertical block address comprises the steps of:
receiving vertical block pulses indicative of the partitioning of said blocks of partitioned pixel data in a vertical direction;
counting said vertical block pulses and thereby producing a counted value; and
generating said restored vertical block address in accordance with said counted value.

12. The variable picture partitioning method according to claim 9, wherein
each said block has a first pixel dimension in the horizontal direction and has a second pixel dimension in the vertical direction; and
said predetermined pixel dimension is less than said first pixel dimension in the horizontal direction and is less than said second pixel dimension in the vertical direction.

13. In an encoding system, a variable picture partitioning circuit which maintains correlation between current frames and respective preceding frames of input video data, comprising:
means for generating a picture partitioning address for each said current frame based on offset data which increases linearly and repetitively from frame to frame by a predetermined pixel dimension at a predetermined interval rate;
means for generating a picture partitioning sync signal; and
means for partitioning each said current frame of the input video data into a plurality of blocks according to said picture partitioning address.

14. The variable picture partitioning circuit according to claim 13, wherein said picture partitioning address generating means comprises:
a horizontal block counter for receiving horizontal block pulses defining block partitions of each said current frame in a horizontal direction, and counting said horizontal block pulses to obtain a counted value;
means for receiving the counted value of said horizontal block counter and generating, for each said current frame, a horizontal block address, which designates positions of said block partitions in a horizontal direction, in accordance with the counted value;
a vertical block counter for receiving vertical block pulses defining block partitions of each said current frame in a vertical direction, and counting said vertical block pulses to obtain a counted value;
means for receiving the counted value of said vertical block counter and generating, for each said current frame, a vertical block address, which designates positions of said block partitions in a vertical direction, in accordance with the counted value;
offset data generating means for receiving a frame-synchronized pulse and thereby generating, for each said current frame, said offset data;

means for adding said horizontal block address to said offset data, and thereby generating a horizontal partitioning address; and means for adding said vertical block address to said offset data, and thereby generating a vertical partitioning address.

15. The variable picture partitioning circuit according to claim 13, wherein said offset data generating means resets said offset data upon attaining a given value, and said picture partitioning sync signal generating means generates the sync signal each time said offset data is reset.

16. The variable picture partitioning circuit according to claim 14, wherein said offset data generating means resets said offset data upon attaining a given value; and said picture partitioning sync signal generating means generates the sync signal each time said offset data is reset.

17. The variable picture partitioning circuit according to claim 14, wherein each said block has a first pixel dimension in the horizontal direction and has a second pixel dimension in the vertical direction; and said predetermined pixel dimension is less than said first pixel dimension in the horizontal direction and is less than said second pixel dimension in the vertical direction.

18. In a decoding apparatus, a variable picture partitioning circuit comprising:

means for receiving frames of video data as blocks of partitioned pixel data that have been partitioned, in an encoding apparatus, in accordance with a variable picture partitioning apparatus comprising (i) means for generating a picture partitioning address for each current frame of input video data based on offset data which increases linearly and repetitively from frame to frame by a predetermined pixel dimension at a predetermined interval rate, (ii) means for generating a picture partitioning sync signal, and (iii) means for partitioning each said current frame of the input video data into a plurality of blocks according to said picture partitioning address; and means for receiving and processing said picture partitioning sync signal and for generating a restored picture partitioning address in accordance with the processing of said sync signal and with analogous offset data which also increases linearly and repetitively from frame to frame by said predetermined pixel dimension and at said predetermined interval rate.

19. The variable picture partitioning circuit according to claim 18, wherein said restored picture partitioning address generating means comprises:

a horizontal block counter for receiving horizontal block pulses indicative of the partitioning of the block data in a horizontal direction, and for counting said horizontal block pulses to obtain a counted value;

means for receiving the counted value of said horizontal block counter and generating, for each said current frame, a horizontal block address, which designates positions of said blocks in a horizontal direction, in accordance with the counted value;

a vertical block counter for receiving vertical block pulses indicative of the partitioning of the block data in a vertical direction, and for counting said vertical block pulses to obtain a counted value;

means for receiving the counted value of said vertical block counter and generating, for each said current frame, a vertical block address, which designates positions of said blocks in a vertical direction, in accordance with the counted value;

offset data generating means for receiving said picture partitioning sync signal through said receiving means and generating, for each said current frame, said analogous offset data in synchronism with said picture partitioning sync signal;

means for adding said horizontal block address to said analogous offset data, and generating a horizontal partitioning address; and means for adding said vertical block address to said analogous offset data, and generating a vertical partitioning address.

20. The variable picture partitioning circuit according to claim 19, wherein each said block has a first pixel dimension in the horizontal direction and has a second pixel dimension in the vertical direction; and said predetermined pixel dimension is less than said first pixel dimension in the horizontal direction and is less than said second pixel dimension in the vertical direction.

* * * * *